United States Patent
Jung et al.

(10) Patent No.: US 8,060,105 B2
(45) Date of Patent: Nov. 15, 2011

(54) APPARATUS AND METHOD FOR DETERMINING RESOURCES FOR PEER TO PEER COMMUNICATION IN COMMUNICATION SYSTEM

(75) Inventors: Young-Ho Jung, Suwon-si (KR); Sang-Min Lee, Seoul (KR); Myeon-Kyun Cho, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 474 days.

(21) Appl. No.: 12/164,973

(22) Filed: Jun. 30, 2008

(65) Prior Publication Data

US 2009/0011770 A1    Jan. 8, 2009

(30) Foreign Application Priority Data

Jul. 5, 2007    (KR) .................. 10-2007-0067771

(51) Int. Cl.
*H04Q 7/20* (2006.01)
(52) U.S. Cl. .................. 455/452.2; 455/502; 455/452.1; 455/455; 455/509; 370/281; 370/278; 370/324; 370/341
(58) Field of Classification Search .................. 455/451, 455/450, 452.1, 452.2, 570–574, 463–464
See application file for complete search history.

(56) References Cited

U.S. PATENT DOCUMENTS

| | | | |
|---|---|---|---|
| 7,283,832 B2 | 10/2007 | Jia et al. | |
| 7,286,842 B2 * | 10/2007 | Li et al. | 455/502 |
| 7,308,266 B2 * | 12/2007 | Du et al. | 455/445 |
| 7,336,638 B2 | 2/2008 | Cheng et al. | |
| 7,539,507 B2 | 5/2009 | Grob et al. | |
| 2006/0258383 A1 * | 11/2006 | Jiang et al. | 455/502 |
| 2008/0280638 A1 * | 11/2008 | Malladi et al. | 455/522 |
| 2009/0016295 A1 * | 1/2009 | Li et al. | 370/330 |
| 2009/0318110 A1 * | 12/2009 | Zarefoss | 455/404.2 |

FOREIGN PATENT DOCUMENTS

| | | |
|---|---|---|
| JP | 2002-271263 A | 9/2002 |
| JP | 2006-520157 A | 8/2006 |
| JP | 2007-501582 A | 1/2007 |
| JP | 2007-512779 A | 5/2007 |

\* cited by examiner

*Primary Examiner* — Kent Chang
*Assistant Examiner* — Keith Fang
(74) *Attorney, Agent, or Firm* — Jefferson IP Law, LLP

(57) ABSTRACT

A method and apparatus for allocating frequency resources for peer to peer (P2P) communication between terminals without a base station are provided. The method determines resources used for a direct communication between two terminals in a communication system. The method includes determining uplink frequency resources of a cellular communication system for use in the direct communication between the two terminals, determining a primary maximum transmission power to minimize interference caused by the direct communication on the cellular communication system and performing the direct communication between the two terminals by using the uplink frequency resources and a transmission power less than the determined primary maximum transmission power.

14 Claims, 3 Drawing Sheets

APPARATUS AND METHOD FOR DETERMINING RESOURCES FOR PEER TO PEER COMMUNICATION IN COMMUNICATION SYSTEM

PRIORITY

This application claims the benefit under 35 U.S.C. §119(a) of a Korean patent application filed in the Korean Industrial Property Office on Jul. 5, 2007 and assigned Serial No. 2007-67771, the entire disclosure of which is hereby incorporated by reference.

BACKGROUND OF THE INVENTION

1. Field of the Invention

The present invention relates to Peer to Peer (P2P) communication between terminals without a base station. More particularly, the present invention relates to an apparatus and method for allocating frequency resources to perform P2P communication between terminals.

2. Description of the Related Art

In general, methods of allocating frequency resources so as to perform Peer to Peer (P2P) communication are classified into two categories. The first is a method of allocating frequency resources that are the same as those used by a base station and terminals to perform communication between terminals. The second is a method of allocating dedicated frequency resources that are different from those used for cellular communication.

When different frequency resources are allocated for use during P2P communication as compared to the resources used during cellular communication, the hardware and communication resources used to perform the P2P communication between terminals are different from those used to perform cellular communication. For example, if the cellular communication uses frequency resources and hardware for second Generation (2G) and third Generation (3G) communications, and the P2P communication uses other frequency resources and hardware such as ZigBee, WiFi, Bluetooth, etc., dual mode hardware must be implemented in order to perform both the P2P communication and the cellular communication in the same device. The implementation of dual mode hardware increases the device complexity and price. Furthermore, the overall performance of P2P communication devices is lower than that of cellular communication devices, making it difficult to obtain a satisfactory P2P communication transmission rate.

On the other hand, if the same frequency resources are allocated for both the P2P communication and the cellular communication, some of the cellular frequency resources must be allocated as frequency resources for the P2P communication. In this case, since providers cannot use all of the frequency resources for cellular communication, if providers fail to establish a sufficient business model for the P2P communication, it is likely that providers will not prefer to allocate frequency resources for P2P communication. Also, user communication charges for the P2P communication may increase.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allocating Peer to Peer (P2P) frequency resources during a period of time and reducing resource consumption by variably allocating some of the frequency resources that are not used for cellular communication as the P2P frequency resources.

Another aspect of the present invention is to provide a method and apparatus for performing P2P communication without reducing the capacity of cellular communication by simultaneously utilizing some of the frequency resources used for the cellular communication for a P2P communication without any control by a base station.

Yet another aspect of the present invention is to provide a method and apparatus for controlling interference from cellular communication affecting P2P communication.

In accordance with an aspect of the present invention, a method of determining resources used for direct communication between two terminals in a communication system is provided. The method includes determining uplink frequency resources of a cellular communication system for use in the direct communication between the two terminals, determining a primary maximum transmission power to minimize interference caused by the direct communication on the cellular communication and performing the direct communication between the two terminals by using the uplink frequency resources and a transmission power less than the determined primary maximum transmission power.

In accordance with another aspect of the present invention, an apparatus for determining resources used for direct communication between two terminals in a communication system is provided. The apparatus includes a device for determining a primary maximum transmission power so as to minimize interference caused by the direct communication of a cellular communication when uplink frequency resources of the cellular communication system are used for the direct communication between the two terminals, and for determining that the uplink frequency resources are used as communication resources between the two terminals within the determined primary maximum transmission power.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Further, various specific definitions found in the following description are provided only to help a general understanding of the present invention, and it is apparent to those skilled in the art that the present invention can be implemented without such definitions. Also, descriptions of well-known functions and constructions are omitted for clarity and conciseness.

Figure 1:
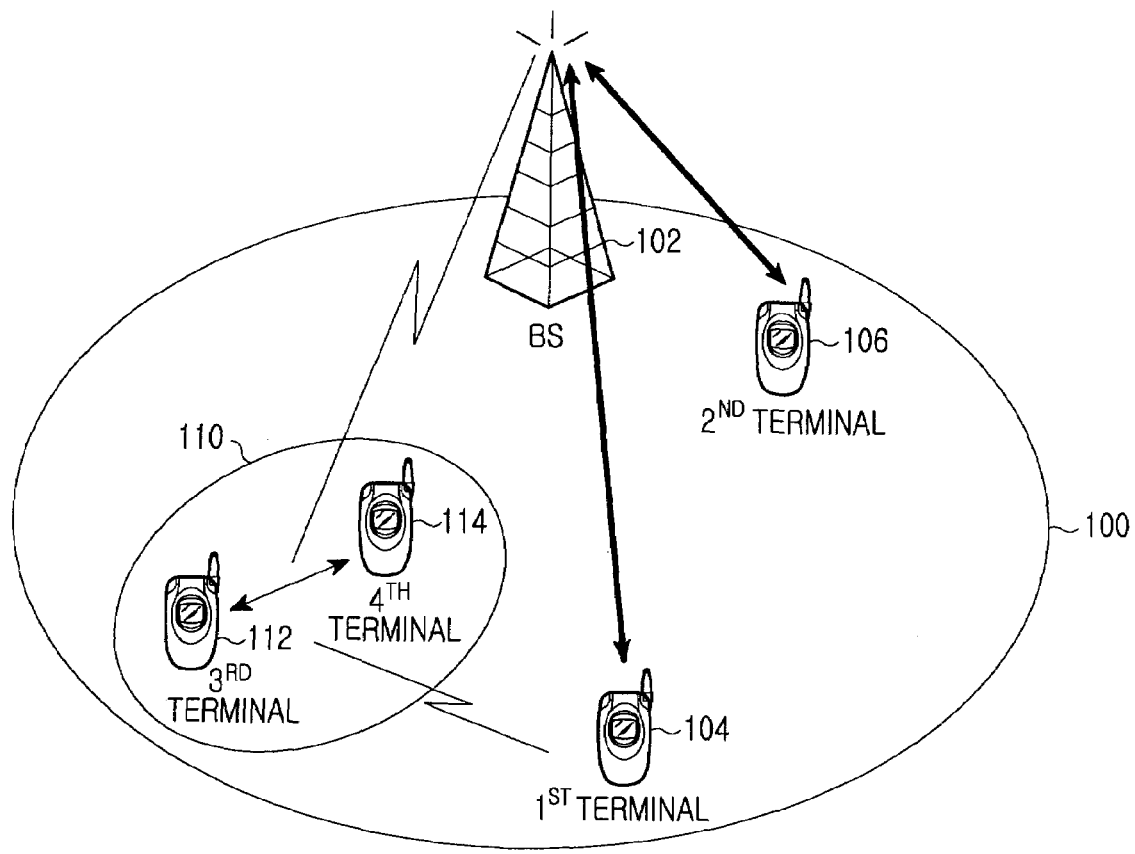
FIG. 1 is a diagram illustrating interference caused during Peer-to-Peer (P2P) communication according to an exemplary embodiment of the present invention.

FIG. 1 is a diagram illustrating Peer-to-Peer (P2P) communication according to an exemplary embodiment of the present invention. Referring to FIG. 1, a cellular cell area 100 covered by a base station 102 includes at least one P2P communication area 110. First and second terminals 104 and 106 are located in the cellular cell area 100. Third and fourth terminals 112 and 114 are located in both the cellular cell area 100 and the P2P communication area 110. Any or all of the first through fourth terminals 104, 106, 112, and 114 may perform P2P communication without the base station 102.

The cellular cell area 100 uses cellular frequency resources to perform cellular communication. The third and fourth terminals 112 and 114, located in the cellular cell area 100 and the P2P communication area 110, also use the cellular frequency resources during the P2P communication.

In more detail, a downlink communication between the base station 102 and terminals (the first terminal 104, the second terminal 106) is a point-to-multipoint communication. Therefore, when the third and fourth terminals 112 and 114 perform P2P communication using downlink frequency resources, the P2P communication causes little interference on the base station 102 because the base station 102 is located relatively far from the third and fourth terminals 112 and 114. However, interference from the third and fourth terminals 112 and 114 may affect the first and second terminals 104 and 106 because they are located relatively close to the P2P communication area 110.

Meanwhile, if the first and second terminals 104 and 106 are located relatively far from the base station 102, an uplink signal must be transmitted with sufficient transmission power so as to be received by the base station 102 from the first and second terminals 104 and 106. In this regard, if the third and fourth terminals 112 and 114 use the uplink frequency resources of the cellular communication system during P2P communication, they will limit their transmission power to avoid causing interference with the base station 102. Accordingly, the communication between the first and second terminals 104 and 106 and the base station 102 is not interrupted within a corresponding transmission power. However, when the cellular communication between the first and second terminals 104 and 106 and the base station 102 uses the same resources as those used in the P2P communication, the cellular communication may cause interference with the P2P communication because the P2P communication uses less power than the cellular communication. A solution for solving the interference will be described later.

An exemplary method of using frequency resources for the P2P communication uses the uplink frequency resources used for the cellular communication to perform the P2P communication. Since the P2P communication and the cellular communication use the same frequency resources, the P2P communication may cause interference with the cellular communication. Therefore, a maximum value of transmission (max Tx) power is limited so as to minimize the potential for interference. If it is not possible to perform the P2P communication within the maximum power value, two options are available. First, additional uplink frequency resources may be allocated as P2P frequency resources. Second, the base station 102 may determine a secondary power maximum value in order to perform the P2P communication and allocate the secondary power maximum value to terminals that perform the P2P communication.

In more detail, a primary power maximum value, used to minimize interference with the cellular communication system during P2P communication, is calculated and the P2P communication is performed within the primary power maximum value. The primary power maximum value is calculated using any one or more of a distance between a source terminal and a base station, receiving power, interference, maximum transmission power, and size of occupied resources according to Equation (1) below, $$\text{P2P maximum power value} = f(\alpha_1 \cdot \text{distance}, \alpha_2 \cdot \text{reception power}, \alpha_3 \cdot \text{interference level}, \alpha_4 \cdot \text{maximum transmission power}, \alpha_5 \cdot \text{occupied resource size}) \quad (1)$$

In equation (1), $\alpha_1$–$\alpha_5$ are identifiers having a value of 0 or 1 to indicate whether to take a corresponding parameter into consideration. Also in equation (1), $f(\ )$ denotes a function having an input of the parameter in the brackets. Of course, the variables used in equation (1) such as a distance between a source terminal and a base station, are not intended to be limiting. That is, the maximum power value may be calculated using other or additional variables beyond those listed here.

If it is not possible to perform P2P communication within the primary power maximum value, frequency resources for a P2P communication that are allocated from the base station among frequency resources dedicated for cellular communication are used to perform the P2P communication by receiving a secondary power maximum value and increasing transmission power or by a method that will be described below.

Another exemplary method of using resources for P2P communication variably allocates some frequency resources that are not used for the cellular communication as frequency resources for the P2P communication during a period of time. In this case, frequency resources that remain after a frequency resource allocation for cellular communication is completed are allocated for the P2P communication. Such allocation of remaining frequency resources can prevent degradation in the efficient use of frequency resources as compared to the fixed allocation of P2P frequency resources. In this regard, the base station transmits information regarding all idle resources that are not used for cellular communication to the source terminal. In an exemplary implementation, the information may be transmitted using a bit Media Access Protocol (MAP), etc. Thereafter, the idle resources are divided into physical resource allocation units according to a P2P frequency resource generation rule that was previously agreed upon between the base station and a user terminal, the physical resource allocation units are mapped with logical resource allocation units, and resource blocks are dedicated to the P2P communication. After resource allocation for the communication between terminals is performed using physical resources, terminals transmit/receive data using corresponding resources in consideration of the mapping relationship between temporally varying logical resources and physical resources.

The resource blocks dedicated to the P2P communication are independently allocated between terminals that will perform the P2P communication through a contention-based resource allocation. The allocation may be performed without detailed control by the base station. Although resources included in the resource blocks are determined as the frequency resources for the P2P communication, terminals can use the frequency resources to perform the P2P communication or determine resources for the P2P communication through the allocation of the base station.

Figure 2:
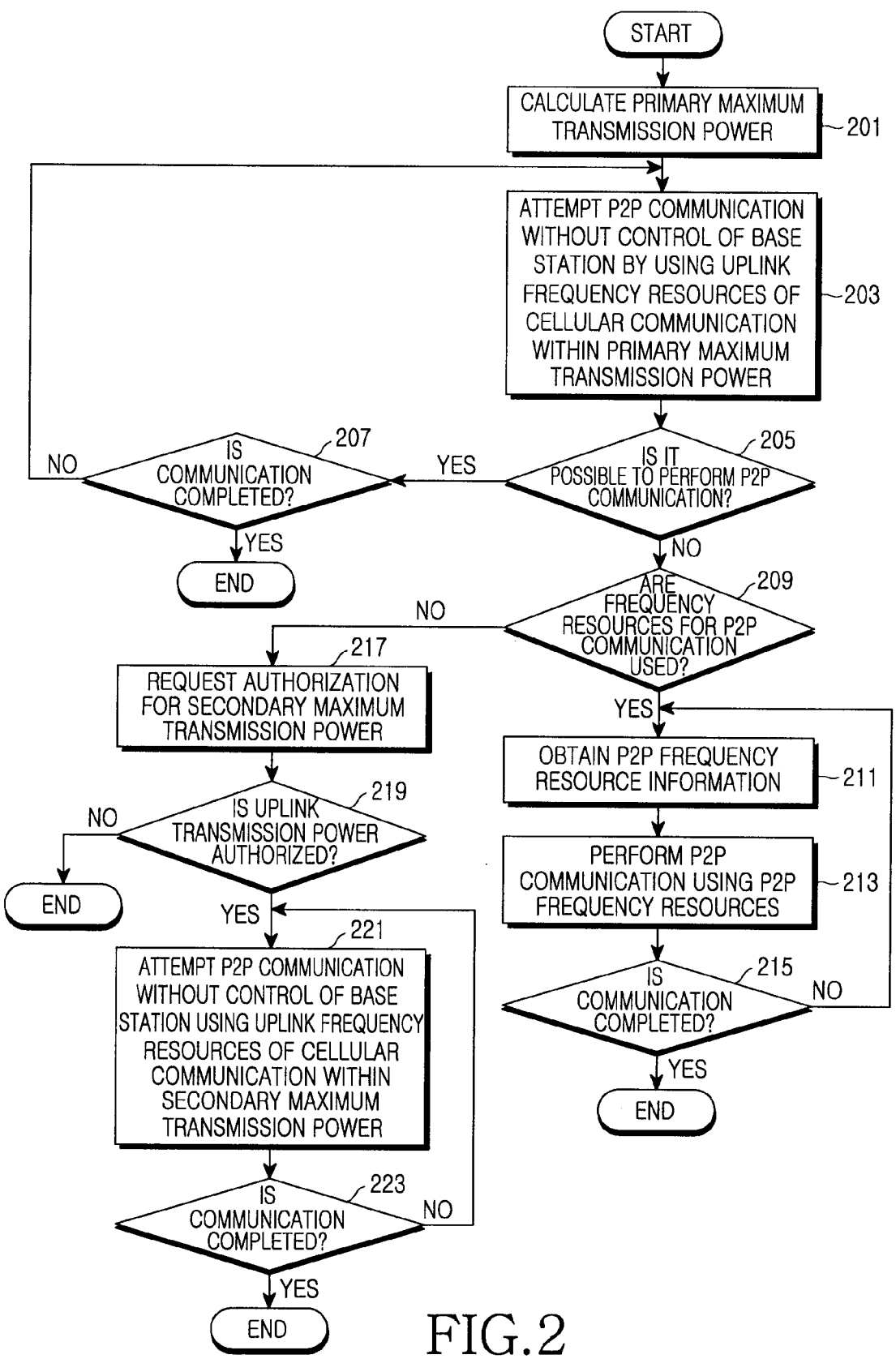
FIG. 2 is a flowchart illustrating an operation of a source terminal that is to perform P2P communication according to an exemplary embodiment of the present invention.

FIG. 2 is a flowchart illustrating an operation of a source terminal that is to perform P2P communication according to an exemplary embodiment of the present invention.

Referring to FIG. 2, in step 201, the source terminal calculates a primary maximum transmission power for the P2P communication. The primary maximum transmission power may be calculated according to a distance between the source terminal and a base station, the size of receiving power, an interference level, etc. The primary maximum transmission power is used to ensure that interference with the base station is maintained below a maximum level, and may be calculated according to Equation 1, for example.

In step 203, the source terminal uses uplink frequency resources used for cellular communication, within the primary maximum transmission power, to attempt P2P communication without prior permission or control of the base station. The uplink frequency resources used for the P2P communication can have a resource mapping rule and transmission method that are different from those used in logically/physically divided basic resource units used to perform a cellular communication from the source terminal to the base station. For example, Orthogonal Frequency Division Multiple Access (OFDMA) may be used to perform the cellular communication between the source terminal and the base station, and Orthogonal Frequency Division Multiplexing (OFDM) and Time Division Multiple Access (TDMA) may be used to perform the P2P communication between the source terminal and the base station. Alternatively, the OFDMA may be used as a multiple access scheme for both the P2P communication and the cellular communication between the source terminal and the base station, and a method of constituting frequency resources can be created and designed with different rules, so as to minimize the number of physical resources that collide according to each logical channel.

In step 205, the source terminal determines whether it is possible to perform the P2P communication within the primary maximum transmission power. If the source terminal determines that it is possible to perform the P2P communication within the primary maximum transmission power, the source terminal proceeds to step 207. If the source terminal determines that it is not possible to perform the P2P communication within the primary maximum transmission power, the source terminal proceeds to step 209.

In step 207, the source terminal determines if the P2P communication between the source terminal and a target terminal is completed. If the P2P communication between the source terminal and the target terminal is completed, the source terminal completes the P2P communication with the target terminal. If the P2P communication between the source terminal and the target terminal is not completed, the source terminal returns to step 203.

In step 209, the source terminal determines whether to use the frequency resources for the P2P communication under the control of the base station according to a provider's preference, a user's preference, a charging system, etc.

If the source terminal determines to use the frequency resources for the P2P communication under the control of the base station, the source terminal proceeds to step 211. If the source terminal determines not to use the frequency resources for the P2P communication under the control of the base station, the source terminal proceeds with step 217.

In step 211, the source terminal determines some resource blocks included in P2P frequency resources as the P2P frequency resources, and receives the determined P2P frequency resources from the base station. The resource blocks are obtained by dividing idle uplinks of cellular frequency resources received from the base station according to a rule that was previously agreed upon between the source terminal and the base station.

In step 213, the source terminal uses the P2P frequency resources to perform the P2P communication with a destination terminal. In step 215, the source terminal determines if the P2P communication with the destination terminal is completed. If the P2P communication with the destination terminal is completed, the source terminal completes the P2P communication and the process is ended. If the P2P communication with the destination terminal is not completed, the source terminal returns to step 211.

In step 217, the source terminal requests the base station to authorize a secondary maximum transmission power. In step 219, if the secondary maximum transmission power is not authorized, the source terminal ends the operation. If the secondary maximum transmission power is authorized, the source terminal proceeds with step 221.

In step 221, the source terminal uses the uplink frequency resources used for the cellular communication within the secondary maximum transmission power to attempt P2P communication without control of the base station. In step 223, the source terminal determines if the P2P communication with the target terminal is completed. If the P2P communication with the target terminal is completed, the source terminal ends the P2P communication with the target terminal. If the P2P communication with the target terminal is not completed, the source terminal returns to step 221.

When the source terminal uses P2P frequency resources only, the source terminal determines the P2P frequency resources through steps 211 to 215.

The P2P communication method, for which frequency resources are not allocated as in steps 217 to 223, uses the uplink frequency resources of the cellular communication system. In this regard, an adjacent terminal performing a cellular communication also uses the uplink frequency resources to communicate with the base station. Such overlapping use may cause fatal interference with the P2P communication. Therefore, three methods of solving this interference problem are suggested below.

First, a resource pattern of resource blocks for the P2P communication, which differs from a resource permutation pattern used for the cellular communication, is used. In this case, a probability of uplink frequency resources, which are used to communicate between adjacent terminals and the base station, colliding with frequency resources, which are used to perform the P2P communication between the adjacent terminals and the base station, is minimized. Although symbols including cellular interference are not decoded, other symbols excluding the cellular interference can be used to decode the symbols including the cellular interference through channel coding.

Second, the cellular communication and the P2P communication may use the same resource permutation pattern with regard to the resource blocks. The base station previously determines a plurality of hopping patterns with regard to the resource blocks used for the P2P communication to periodically hop the resource blocks among the plurality of hopping patterns or hop the resource blocks only when an Negative ACKnowlegement (NACK) occurs. In this case, when a cellular communication terminal and an adjacent P2P communication terminal use the same physical channel, the frequency resources of the P2P communication cause interference, so that the NACK occurs. Meanwhile, during the retransmission of data, the cellular communication terminal and an adjacent P2P communication terminal use different physical resources due to the hopping of resource blocks, which does not cause any interference.

A third method is a combination of the first and second methods.

Figure 3:
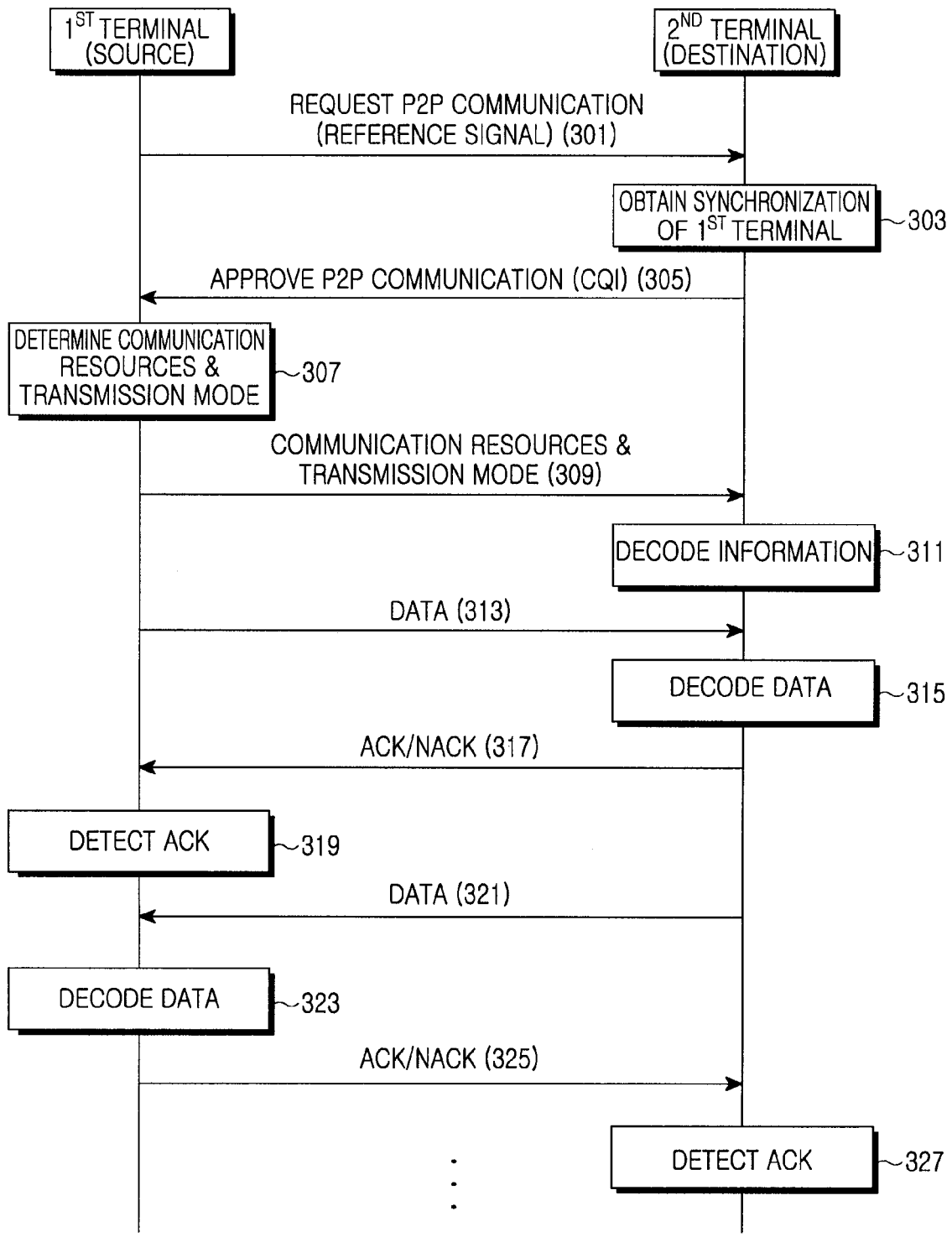
FIG. 3 is a flowchart illustrating interference solving solution applied to P2P communication for which dedicated resources are not allocated according to an exemplary embodiment of the present invention.

FIG. 3 is a flowchart illustrating a method for reducing interference applied to a P2P communication for which dedicated resources are not allocated according to an exemplary embodiment of the present invention. In the illustrated example, a first terminal is a source terminal used for the P2P communication and a second terminal is a destination terminal used for the P2P communication.

Referring to FIG. 3, in step 301, the first terminal transmits a P2P communication request message including a reference signal to the second terminal. The reference signal is used to obtain synchronization of the second terminal. The P2P communication request message can be continuously transmitted within a primary maximum transmission power. When the transmission power is sufficient and needs to exceed the primary maximum transmission power, the P2P communication request message can be transmitted using a corresponding increased transmission power after obtaining authorization of an increase in maximum transmission power from a value that increases in stages from a base station.

In step 303, the second terminal obtains synchronization with the first terminal via the reference signal received from the first terminal. In step 305, the second terminal transmits a P2P communication response message including an approval to the P2P communication request message and Channel Quality Information (CQI) of the second terminal to the first terminal.

In step 307, the first terminal determines frequency resource information and transmission mode information in order to perform the P2P bidirectional communication with the second terminal, i.e. from the first terminal to the second terminal and from the second terminal to the first terminal. In this regard, the frequency resource information and transmission mode information are determined according to the three above-described interference prevention methods.

In step 309, the first terminal transmits the determined frequency resource information and transmission mode information to the second terminal. In step 311, the second terminal decodes the received frequency resource information and transmission mode information.

In step 313, the first terminal uses the frequency resource information and transmission mode information to transmit data to the second terminal. In step 315, the second terminal decodes the received data. In step 317, the second terminal transmits an ACK/NACK, indicating whether the data is successfully received, to the first terminal.

In step 319, the first terminal detects the ACK. In step 321, the first terminal receives data from the second terminal. In step 323, the first terminal decodes the received data. In step 325, the first terminal transmits the ACK/NACK of the received data to the second terminal. In step 327, the second terminal receives the ACK. Thereafter, the first and second terminals use the frequency resource information and transmission mode information to which the interference prevention methods are applied in step 309 in order to continuously transmit/receive data.

Likewise, when the P2P frequency resources received from the base station in steps 211 to 215 shown in FIG. 2 are used, a transmission mode and frequency resources to which the three interference prevention methods are applied are determined during the transmission/reception of data for the P2P communication.

With regard to the exemplary embodiments of the present invention as described above, effects of the representative embodiments will now be described in brief below.

The present invention variably allocates some of the frequency resources that are not used for cellular communication as P2P frequency resources, thereby lessening a reduction in cellular capacity and minimizing frequency resource consumption.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of determining resources used for direct communication between two terminals in a communication system, the method comprising:
    determining uplink frequency resources of a cellular communication system for use in the direct communication between the two terminals;
    determining a primary maximum transmission power to minimize interference caused by the direct communication on the cellular communication system; and
    performing the direct communication between the two terminals using the uplink frequency resources and a transmission power less than the determined primary maximum transmission power,
    wherein the performing of the direct communication comprises one of a first scheme and a second scheme,
    wherein the first scheme comprises dividing the uplink frequency resources according to a method that is the same as that of dividing the uplink frequency resources used by a base station, determining a plurality of hopping patterns used for the direct communication with regard to the divided uplink frequency resources, informing one or more target terminals that perform the direct communication about a pattern selected from the plurality of hopping patterns, and performing the direct communication by using frequency resources according to the selected pattern, and
    wherein the second scheme comprises dividing the uplink frequency resources according to a method that is different from that of dividing the uplink frequency resources of the cellular communication used by the base station, and performing the direct communication by using the divided uplink frequency resources.

2. The method of claim 1, wherein the uplink frequency resources are simultaneously used for the direct communication between the two terminals and cellular communication between the base station and at least one of the two terminals.

3. The method of claim 1, wherein the primary maximum transmission power is determined according to at least one of a distance between at least one of the two terminals and the base station, a receiving power, an interference value, a maximum transmission power, and a size of occupied resources.

4. The method of claim 3, wherein the determining of the uplink frequency resources comprises determining parameters according to at least one of an allowable interference level, a cellular communication resource occupancy rate, the number of terminals in a cell, and a distance between the base station and each terminal.

5. The method of claim 4, further comprising broadcasting information regarding the uplink frequency resources to terminals in the cell, wherein the base station performs the determining of the uplink frequency resources and the broadcasting.

6. The method of claim 1, wherein the determining of the primary maximum transmission power comprises:
   determining a control value relating to an allowable interference level according to at least one of a cellular communication resource occupancy rate, the number of terminals in a cell, and a distance between the base station and at least one of the two terminals;
   broadcasting the control value to the terminals in the cell, wherein the base station performs the determining of the control value and the broadcasting; and
   determining the primary maximum transmission power additionally according to at least one parameter of the control value, the distance between the base station and each terminal, a receiving power, interference, a maximum transmission power, and sizes of occupied resources, wherein each terminal performing the direct communication performs the determining of the primary maximum transmission power.

7. The method of claim 1, further comprising:
   when the two terminals do not perform the direct communication within the primary maximum transmission power, requesting the base station to send a secondary maximum transmission power used for Peer-to-Peer (P2P) communication; and
   if the secondary maximum transmission power is received from the base station, performing the direct communication using the uplink frequency resources within the secondary maximum transmission power.

8. An apparatus for determining resources used for direct communication between two terminals in a communication system, the apparatus comprising:
   a device for determining a primary maximum transmission power to minimize interference caused by the direct communication of a cellular communication system when uplink frequency resources of the cellular communication system are used for the direct communication between the two terminals, and for determining that the uplink frequency resources are used as communication resources between the two terminals within the determined primary maximum transmission power,
   wherein the device performs the direct communication using one of a first scheme and a second scheme,
   wherein if the first scheme is used, the device divides the uplink frequency resources according to a method that is the same as that of dividing the uplink frequency resources used by a base station, determines a plurality of hopping patterns used for the direct communication with regard to the divided uplink frequency resources, informs one or more target terminals that perform the direct communication about a pattern selected from the plurality of hopping patterns, and performs the direct communication by using frequency resources according to the selected pattern, and
   wherein if the second scheme is used, the device divides the uplink frequency resources according to a method that is different from that of dividing the uplink frequency resources of the cellular communication used by the base station, and performs the direct communication by using the divided uplink frequency resources.

9. The apparatus of claim 8, wherein the uplink frequency resources are simultaneously used for the direct communication between the two terminals and for cellular communication between the base station and at least one of the two terminals.

10. The apparatus of claim 8, wherein the primary maximum transmission power is determined according to at least one of a distance between at least one of the two terminals and the base station, a receiving power, an interference value, a maximum transmission power, and a size of occupied resources.

11. The apparatus of claim 10, wherein the base station determines the uplink frequency resources according to at least one of an allowable interference level, a cellular communication resource occupancy rate, the number of terminals in a cell, and a distance between the base station and each terminal.

12. The apparatus of claim 11, wherein the base station broadcasts information regarding the uplink frequency resources to terminals in the cell.

13. The apparatus of claim 8, wherein the base station determines a control value relating to an allowable interference level according to at least one of a cellular communication resource occupancy rate, the number of terminals in a cell, and a distance between the base station and each terminal, and broadcasts the control value to the terminals in the cell, and
   each terminal performing the direct communication determines the primary maximum transmission power additionally according to at least one parameter of the control value, a distance between the base station and each terminal, a receiving power, interference, a maximum transmission power, and sizes of occupied resources.

14. The apparatus of claim 8, wherein, when the two terminals do not perform the direct communication within the primary maximum transmission power, at least one of the two terminals transmits a message requesting a secondary maximum transmission power used for the communication between the two terminals to the base station, and
   if the at least one of the two terminals receives the secondary maximum transmission power from the base station, the two terminals perform the direct communication by using the uplink frequency resources within the secondary maximum transmission power.

* * * * *